US009991780B2

United States Patent
Kuo et al.

(10) Patent No.: US 9,991,780 B2
(45) Date of Patent: Jun. 5, 2018

(54) DEVICES AND METHODS OF CANCELLING THE SWITCHING NOISE FROM POWER MANAGEMENT INTEGRATED CIRCUITS

(71) Applicant: MediaTek Inc., Hsin-Chu (TW)

(72) Inventors: Jhe-Jia Kuo, Huwei Township, Yunlin County (TW); Fu-Yi Han, Taichung (TW)

(73) Assignee: MEDIATEK INC., Hsin-Chu (TW)

( * ) Notice: Subject to any disclaimer, the term of this patent is extended or adjusted under 35 U.S.C. 154(b) by 296 days.

(21) Appl. No.: 14/829,972

(22) Filed: Aug. 19, 2015

(65) Prior Publication Data

US 2016/0149479 A1 May 26, 2016

Related U.S. Application Data

(60) Provisional application No. 62/083,420, filed on Nov. 24, 2014.

(51) Int. Cl.
*H02M 1/12* (2006.01)
*H02M 3/155* (2006.01)
*H02M 3/158* (2006.01)

(52) U.S. Cl.
CPC ........... *H02M 1/12* (2013.01); *H02M 3/1584* (2013.01)

(58) Field of Classification Search
None
See application file for complete search history.

(56) References Cited

U.S. PATENT DOCUMENTS

| 5,682,303 A | 10/1997 | Goad |
| 6,300,589 B1 | 10/2001 | Reynolds et al. |
| 7,466,086 B2 | 12/2008 | Kiuchi et al. |
| 9,397,647 B2 * | 7/2016 | Romano ............... H03K 5/131 |
| 2009/0251096 A1 * | 10/2009 | Schulz ................. H02P 6/10 318/801 |
| 2014/0009986 A1 * | 1/2014 | Nanut .................... H02M 1/12 363/68 |
| 2016/0099733 A1 * | 4/2016 | Weissman ........... H04B 17/354 455/114.2 |

FOREIGN PATENT DOCUMENTS

| CN | 1163811 A | 11/1997 |
| CN | 1592063 A | 3/2005 |
| CN | 1897455 A | 1/2007 |
| CN | 102013806 A | 4/2011 |

* cited by examiner

*Primary Examiner* — Jared Fureman
*Assistant Examiner* — Aqeel Bukhari
(74) *Attorney, Agent, or Firm* — McClure, Qualey & Rodack, LLP

(57) ABSTRACT

A power management device includes a first power unit, a second power unit, and a control unit. The first power unit receives a first control signal of a first phase to generate a first current of the first phase flowing to an output node. The second power unit receives a second control signal of a second phase to generate a second current of the second phase flowing to the output node. A phase delay is the difference between the first phase and the second phase. The control unit receives a clock signal in a clock frequency to generate the first control signal and the second control signal. The control unit controls the phase delay to cancel a corresponding harmonic of the clock frequency at the output node.

19 Claims, 5 Drawing Sheets

DEVICES AND METHODS OF CANCELLING THE SWITCHING NOISE FROM POWER MANAGEMENT INTEGRATED CIRCUITS

CROSS REFERENCE TO RELATED APPLICATIONS

This application claims the benefit of U.S. Provisional Application No. 62/083,420, filed on Nov. 24, 2014, the contents of which are incorporated herein by reference.

BACKGROUND OF THE INVENTION

Field of the Invention

The disclosure relates generally to methods and devices for mitigating switching noise from power management integrated circuits, and more particularly it relates to methods and devices for adjusting phase delays among at least two switched-mode DC-DC power converters.

Description of the Related Art

Switched-mode DC-DC converters are important in portable electronic devices such as cellular phones and laptop computers, which are supplied with power primarily from batteries. Such electronic devices often contain several sub-circuits, each with its own voltage level requirement that is different from that supplied by the battery or an external supply (sometimes higher or lower than the supply voltage). Additionally, the battery voltage declines as its stored energy is drained. Switched-mode DC-DC converters offer a method to increase voltage from a partially lowered battery voltage thereby saving space instead of using multiple batteries to accomplish the same thing. Most switched-mode DC-DC converters also regulate the output voltage.

Electronic switched-mode DC-DC converters convert one DC voltage level to another by storing the input energy temporarily and then releasing that energy to the output at a different voltage. The storage may be in either magnetic field storage components (inductors, transformers) or electric field storage components (capacitors). This conversion method is more power efficient (often 75% to 98%) than linear voltage regulation (which dissipates unwanted power as heat). This efficiency is beneficial to increasing the running time of battery-operated devices. The efficiency has increased since the late 1980s due to the use of power FETs, which are able to switch at high frequency more efficiently than power bipolar transistors, which incur more switching losses and require a more complicated drive circuit. Another important innovation in switched-mode DC-DC converters is the use of synchronous rectification replacing the flywheel diode with a power FET with low "on-resistance", thereby reducing switching losses.

Most switched-mode DC-DC converters are designed to move power in only one direction, from the input to the output. However, all switching regulator topologies can be made bi-directional by replacing all diodes with independently controlled active rectification. A bi-directional converter can move power in either direction, which is useful in applications requiring regenerative braking Switched-mode DC-DC converters are now available as integrated circuits needing minimal additional components. They are also available as a complete hybrid circuit component, ready for use within an electronic assembly.

However, each switched-mode DC-DC converter works with a clock signal, such that discontinuous current occurs at the output node. That is, switched-mode DC-DC converters generate switching spurs at the output node. The sensitive circuits, such as RF transceiver circuits, suffer interference issues from the switching spurs. For the sake of mitigating interference, which is generated by the switched-mode DC-DC converters, to the sensitive circuits, devices and methods for effectively mitigating the switching spurs are necessarily required.

BRIEF SUMMARY OF THE INVENTION

For solving the problems described above, the invention provides devices and methods for mitigating switching noise from power management integrated circuits. The invention further integrates at least two switched-mode DC-DC power converters with different phase delays to cancel switching noise.

In an embodiment, a power management device comprises a first power unit, a second power unit, and a control unit. The first power unit receives a first control signal of a first phase to generate a first current of the first phase flowing to an output node. The second power unit receives a second control signal of a second phase to generate a second current of the second phase flowing to the output node, wherein a phase delay is the difference between the first phase and the second phase. The control unit, receiving a clock signal in a clock frequency to generate the first control signal and the second control signal, wherein the control unit controls the phase delay to cancel the corresponding harmonic of the clock frequency at the output node.

In an embodiment of the power management device, the control unit controls the time delay between the first control signal and the second control signal to control the phase delay.

In an embodiment of the power management device, the inverse of the clock frequency is the clock period ($T_C$), wherein the control unit adjusts the time delay to be $$\frac{n}{m} \cdot \frac{T_S}{2},$$

such that the phase delay is n·π and an m-th harmonic is cancelled at the output node, wherein n is an odd integer.

In an embodiment of the power management device, the control unit controls the time delay to be half of the clock period, such that the phase delay is equal to π and odd harmonics are cancelled at the output node.

In an embodiment of the power management device, a first coupling path from the first power unit to the output node and a second coupling path from the second power unit to the output node are symmetric.

In an embodiment of the power management device, each of the first and second power units is a switched-mode DC-DC power converter, and generates DC power at the output node.

In an embodiment, a power management device comprises a power-generation module and a control unit. The power-generation module comprises at least two power units, wherein each of the power units receives a respective control signal of a respective phase to generate a respective current of the respective phase flowing to an output node, wherein at least one phase delay is a difference among the respective phases. The control unit receives a clock signal in a clock frequency to generate the control signals wherein the control unit controls the phase delay to cancel a corresponding harmonic of the clock frequency at the output node.

In an embodiment of the power management device, the power units comprise a first power unit and a second power unit. The first power unit receives a first control signal of a first phase to generate a first current of the first phase flowing to the output node. The second power unit receives a second control signal of a second phase to generate a second current of the second phase flowing to the output node, wherein the phase delay is the difference between the first phase and the second phase.

In an embodiment of the power management device, the control unit controls the time delay between the first control signal and the second control signal to control the phase delay.

In an embodiment of the power management device, the inverse of the clock frequency is the clock period ($T_C$), wherein the control unit adjusts the time delay to be $$\frac{n}{m} \cdot \frac{T_S}{2},$$

such that the phase delay is n·π and an m-th harmonic is cancelled at the output node, wherein n is an odd integer.

In an embodiment of the power management device, the control unit controls the phase delay to be half of the clock period, such that the phase delay is equal to π and odd harmonics are cancelled at the output node.

In an embodiment of the power management device, a first coupling path from the first power unit to the output node and a second coupling path from the second power unit to the output node are symmetric.

In an embodiment of the power management device, each of the first and second power units is a switched-mode DC-DC power converter, and generates DC power at the output node.

In an embodiment, a harmonic cancellation method for mitigating harmonics of a power management device at an output node comprises: receiving a clock signal in a clock frequency to generate a first control signal of a first phase and a second control signal of a second phase, wherein the phase delay is the difference between the first phase and the second phase; receiving, by a first power unit, the first control signal to generate a first current of the first phase flowing to the output node; receiving, by a second power unit, the second control signal to generate a second current of the second phase flowing to the output node; and controlling the phase delay to cancel a corresponding harmonic of the clock frequency at the output node.

An embodiment of the harmonic cancellation method further comprises controlling the time delay between the first control signal and the second control signal to control the phase delay.

In an embodiment of the harmonic cancellation method, the inverse of the clock frequency is the clock period ($T_C$), wherein the step of controlling the phase delay to cancel the corresponding harmonic of the clock frequency at the output node further comprises: controlling the time delay to be $$\frac{n}{m} \cdot \frac{T_S}{2},$$

such that the phase delay is n·π and an m-th harmonic is cancelled at the output node, wherein n is an odd integer.

In an embodiment of the harmonic cancellation method, the step of controlling the time delay to be $$\frac{n}{m} \cdot \frac{T_S}{2},$$

further comprises: controlling the time delay to be half of the clock period, such that the phase delay is equal to π and odd harmonics are cancelled at the output node.

In an embodiment of the harmonic cancellation method, a first coupling path from the first power unit to the output node and a second coupling path from the second power unit to the output node are symmetric.

In an embodiment of the harmonic cancellation method, each of the first and second power units is a switched-mode power converter, and generates DC power at the output node.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
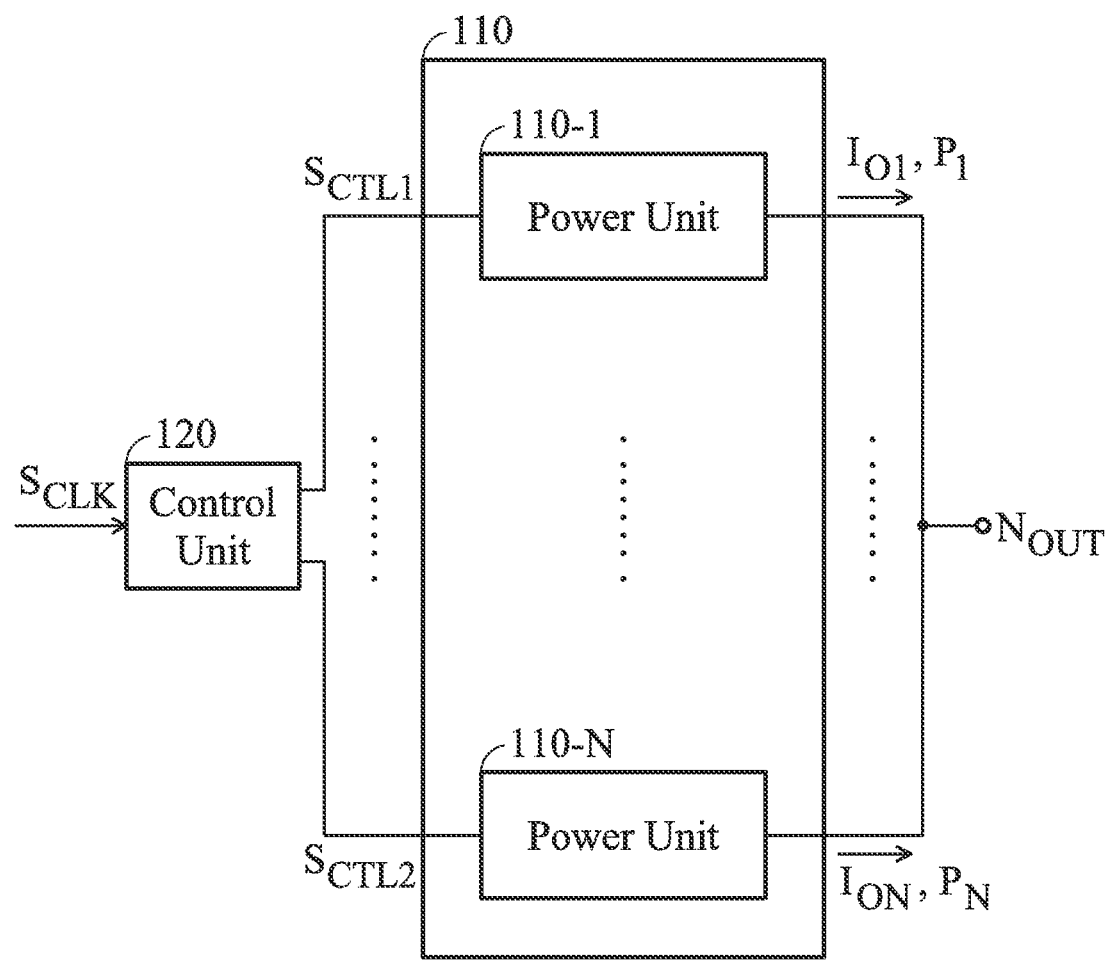
FIG. 1 is a block diagram of a power management device in accordance with an embodiment of the invention.

FIG. 1 is a block diagram of a power management device in accordance with an embodiment of the invention. As shown in FIG. 1, the power management device 100 includes the power-generation module 110 and the control unit 120. The power-generation module 110 includes a plurality of power units 110-1~110-N, in which N is a positive integer. The power units 110-1~110-N receive the control signals $S_{CTL1}$~$S_{CTLN}$ of respective phases $P_1$~$P_N$ to generate the currents $I_{O1}$~$I_{ON}$ of the respective phases $P_1$~$P_N$ flowing to the output node $N_{OUT}$ respectively.

The control unit 120 receives the clock signal $S_{CLK}$ in the clock frequency $F_C$ to provide the control signals $S_{CTL1}$~$S_{CTLN}$ of the respective phases $P_1$~$P_N$ for the power units 110-1~110-N respectively. According to an embodiment of the invention, the control unit 120 controls the phase delays among the phases $P_1$~$P_N$ to cancel a corresponding harmonic of the clock frequency $F_C$ at the output node. The relationship between the phase delay and the cancelled harmonic will be introduced in the following description.

According to an embodiment of the invention, only two power units can be used to cancel the corresponding harmonic of the clock frequency $F_C$ at the output node. For the convenience of illustration, an embodiment of two power units is illustrated in the following description. One skilled in the art can readily anticipate the implementation with more than two power units according to the following description.

Figure 2:
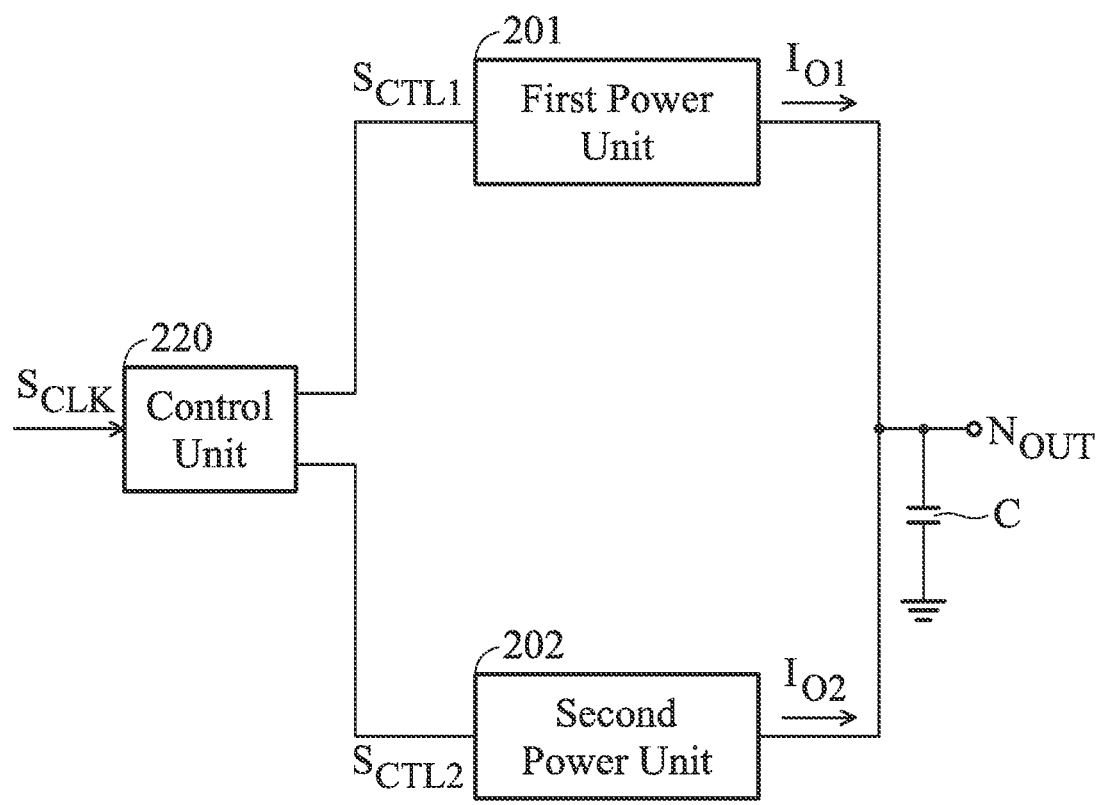
FIG. 2 is a block diagram of a power management device in accordance with another embodiment of the invention.

FIG. 2 is a block diagram of a power management device in accordance with another embodiment of the invention. As shown in FIG. 2, the power management device 200 includes the first power unit 201, the second power unit 202, and the control unit 220. According to an embodiment of the invention, the first power unit 201 and the second power unit 202 are switched-mode DC-DC converters, such as buck converters or boost converters. According to another embodiment of the invention, the first power unit 201 and the second power unit 202 are other switched-mode circuits which produce switching noise at the output node $N_{OUT}$.

According to an embodiment of the invention, the first power unit 201 and the second power unit 202 are identical and symmetric to the output node $N_{OUT}$. In other words, the first power unit 201 and the second power unit 202 produce the same magnitude of current flowing to the output node $N_{OUT}$, and the coupling path from the first power unit 201 to the output node $N_{OUT}$ and that of the second power unit 202 to the output node $N_{OUT}$ are of the symmetric layout placement and the same length.

According to an embodiment of the invention, the first power unit 201 and the second power unit 202 are switched-mode DC-DC converters, such that a capacitor C is required to suppress the ripple at the output node $N_{OUT}$. The control unit 220 receives the clock signal $S_{CLK}$ in the clock frequency $F_C$ to provide the first control signal $S_{CTL1}$ and the second control signal $S_{CTL2}$ for the first power unit 201 and the second power unit 202.

According to the embodiment of the invention, since the first power unit 201 and the second power unit 202 are switched-mode DC-DC converters, each of the first power unit 201 and the second power unit 202 includes an upper switch, and lower switch, and an inductor of a switch-mode DC-DC converter. The control unit 220 respectively provides the first control signal $S_{CTL1}$ and the second control signal $S_{CTL2}$ for the first power unit 201 and the second power unit 202, such that the corresponding upper and lower switches are accordingly turned ON and OFF to generate the first current $I_{O1}$ and the second current $I_{O2}$ with a phase delay $\phi$ between them.

The first current $I_{O1}$ and the second current $I_{O2}$ flow through the corresponding inductor and are summed up at the output node $N_{OUT}$. In other words, if the first power unit 201 and the second power unit 202 are identical and output the same amount of current, the current at the output node $N_{OUT}$ is twice of the first current $I_{O1}$ or the second current $I_{O2}$.

According to the embodiment of the invention, since the first power unit 201 and the second power unit 202 are switched-mode DC-DC converters, the harmonics of the clock frequency $F_C$ should occur at the output node $N_{OUT}$ as spurs. According to an embodiment of the invention, when the voltage at the output node $N_{OUT}$ is applied to a sensitive circuit, such as the RF transceiver circuits, the sensitive circuit suffers interference issues from the switching spurs at the output node $N_{OUT}$. The unwanted harmonics of the clock frequency $F_C$ can be effectively cancelled by properly controlling the phase delay $\phi$ between the first current $I_{O1}$ and the second current $I_{O2}$. The unwanted harmonic cancellation methods will be clearly explained in the following description.

According the an embodiment of the invention, the first power unit 201 and the second power unit 201 are identical, so that the first current $I_{O1}$ and the second current $I_{O2}$ are of the same magnitude. The spectrums of the first current $I_{O1}$ and the second current $I_{O2}$ are expressed in Eq. 1 and Eq. 2, respectively:

$$I_{O1}(\omega) = \mathcal{F}[i_{O1}(t)] \quad \text{(Eq. 1)}$$
$$= I_0 + I_1(\omega) + I_2(2\omega) + I_3(3\omega) + I_4(4\omega) + I_5(5\omega) + \ldots$$

$$I_{O2}(\omega) = \mathcal{F}[i_{O1}(t - t_d)] \quad \text{(Eq. 2)}$$
$$= e^{j\omega t_d} I_{O1}(\omega)$$
$$= I_0 + e^{j\omega t_d} I_1(\omega) + e^{j2\omega t_d} I_2(2\omega) + e^{j3\omega t_d} I_3(3\omega) +$$
$$e^{j4\omega t_d} I_4(4\omega) + e^{j5\omega t_d} I_5(5\omega) + \ldots$$

As shown in Eq. 1 and Eq. 2, the first power unit 201 and the second power unit 201 in time domain are transformed into frequency domain by the Fourier transformation. However, the phase delay $\phi$ could be regarded as a time delay $t_d$. Since there is only the time delay $t_d$ between the first current $I_{O1}$ and the second current $I_{O2}$ which are of the same magnitude, the difference between the spectrum of the first current $I_{O1}(\omega)$ and the spectrum of the second current $I_{O2}(\omega)$ is only a phase delay. In other words, the phase delay $\phi$ is equal to $\omega t_d$.

The output current $I_{OUT}$ at the output node $N_{OUT}$ summing the first current $I_{O1}$ and the second current $I_{O2}$ can be expressed in Eq. 3 as follows:

$$I_{OUT}(\omega) = |C_1(\omega)|e^{j\phi_1} \cdot I_{O1}(\omega) + |C_2(\omega)|e^{j\phi_2} \cdot I_{O2}(\omega) \quad \text{(Eq. 3)}$$
$$= (|C_1(\omega)|e^{j\phi_1} \cdot 1 + |C_2(\omega)|e^{j\phi_2} \cdot e^{j\omega t_d}) \cdot I_{O1}(\omega)$$

In Eq. 3, $|C_1(\omega)|$ and $|C_2(\omega)|$ are the magnitude part of the coupling transfer function of the first current $I_{O1}$ or the second current $I_{O2}$ flowing to the output node $N_{OUT}$ respectively, and $\phi_1$ or $\phi_2$ is the phase part of the coupling transfer function of the first current $I_{O1}$ or the second current $I_{O2}$ to the output node $N_{OUT}$ respectively. According to an embodiment of the invention, the coupling path of the first current $I_{O1}$ to the output node $N_{OUT}$ and that of the second current $I_{O2}$ to the output node $N_{OUT}$ are symmetric. Namely, $|C_1(\omega)|=|C_2(\omega)|=|C_t(\omega)|$, and $\phi_1=\phi_2=\phi_t$. Therefore, Eq. 3 can be simplified as shown in Eq. 4:

$$I_{OUT}(\omega) = (1 + e^{j\omega t_d}) \cdot |C_t(\omega)e^{j\phi_t}| \cdot I_{O1}(\omega) \quad \text{(Eq. 4)}$$
$$= (1 + e^{j2\pi nF_C \cdot t_d}) \cdot |C_t(\omega)e^{j\phi_t}| \cdot I_{O1}(\omega)$$
$$= \left(1 + e^{j2\pi \cdot n \cdot \frac{t_d}{T_C}}\right) \cdot |C_t(\omega)e^{j\phi_t}| I_{O1}(\omega)$$

As shown in Eq. 4, the clock period $T_C$ is the inverse of the clock frequency $F_C$. In order to cancel a specific harmonic of the clock frequency $F_C$ at the output node $N_{OUT}$, the only thing one needs to be concerned with is whether the term $$\left(1 + e^{j2\pi \cdot n \cdot \frac{t_d}{T_C}}\right)$$

is zero or not.

There are two conditions to make the term $$\left(1 + e^{j2\pi \cdot n \cdot \frac{t_d}{T_C}}\right)$$

be zero. In the first condition, the phase delay should be odd multiples of 180 degrees, which is shown in Eq. 5 as follows:

$$\left(1 + e^{j2\pi \cdot n \cdot \frac{t_d}{T_C}}\right) = (1 + e^{j\pi \cdot n}) = 0, \text{ when } n = 1, 3, 5, 7, 9... \quad \text{(Eq. 5)}$$

That is, when the time delay $t_d$ is odd multiples of half of the clock period $T_C$ (i.e., $$\left(\text{i.e., } t_d = n \cdot \frac{T_C}{2}\right),$$

all the odd harmonics of the clock frequency $F_C$ are cancelled at the output node $N_{OUT}$.

In the second condition, the phase delay should be some specific number multiples of 90 degrees, which is shown in Eq. 6 as follows:

$$\left(1 + e^{j2\pi \cdot n \cdot \frac{t_d}{T_C}}\right) = \left(1 + e^{j\pi \cdot \frac{n}{2}}\right) = 0, \text{ when } n = 2, 6, 10, 14, 18... \quad \text{(Eq. 6)}$$

Namely, when the time delay $t_d$ is some specific number multiples of a quarter of the clock period $T_C$ (i.e., $$\left(\text{i.e., } t_d = n \cdot \frac{T_C}{4}\right),$$

corresponding harmonics of the clock frequency $F_C$ are cancelled at the output node $N_{OUT}$. Comparing the first condition with the second condition, the harmonics cancelled in the second condition could be interpreted as that the fundamental frequency is doubled and the odd harmonics of the doubled fundamental frequency are cancelled in the second condition.

For the purpose of clearly explaining whether the first or second condition is advantageous, an embodiment of the invention will be illustrated in the following description. According to an embodiment, the voltage of the output node $N_{OUT}$ is applied to an RF circuit as a supply voltage. The RF circuit operates in the FM band (70~120 MHz), and the clock frequency $F_C$ is 6 MHz. In other words, only the harmonics within 70~120 MHz are concerned.

TABLE 1

| | Spurs within FM Band | | | | | | | | |
|---|---|---|---|---|---|---|---|---|---|
| | 72 | 78 | 84 | 90 | 96 | 102 | 108 | 114 | 120 |
| Cancelled Harmonics in the 1st Condition | 6 | 18 | 30 | 42 | 54 | 66 | 78 | 90 | 102 | 114 |

TABLE 1-continued

| | Spurs within FM Band | | | | | | | | |
|---|---|---|---|---|---|---|---|---|---|
| | 72 | 78 | 84 | 90 | 96 | 102 | 108 | 114 | 120 |
| Cancelled Harmonics in the 2nd Condition | 12 | 36 | 60 | 84 | 108 | 132 | 156 | 180 | 204 | 228 |

Since the FM band ranges from 70 MHz to 120 MHz, the row named spurs within FM band in Table 1 lists all the harmonics, which are caused by the clock frequency $F_C$, are within the FM band. The second row of Table 1, which is named cancelled harmonics in the first condition, lists the harmonics caused by the clock frequency $F_C$ that can be cancelled in the first condition. In other words, the cancelled odd harmonics of the clock frequency $F_C$, which is ranging from $1^{st}$ to $19^{th}$ harmonics, are listed in the second row of Table 1, in which 78 MHz, 90 MHz, 102 MHz, and 114 MHz are within the FM band listed in the first row of Table 1. In other words, 4 spurs within the FM band can be cancelled in the first condition.

The third row of Table 1, which is named cancelled harmonics in the $2^{nd}$ condition, lists the harmonics caused by the clock frequency $F_C$ that can be cancelled in the second condition. It should be noted that the harmonics of the third row of Table 1 are twice those listed in the second row. In addition, only 84 MHz and 108 MHz that are cancelled in the second condition are within the FM band. In other words, the harmonics within the desired band can be more effectively cancelled in the first condition.

As stated above, the harmonics of 78 MHz, 90 MHz, 102 MHz, and 114 MHz can be cancelled in the first condition by making $$t_d = n \cdot \frac{T_S}{2},$$

where n is an odd integer. According to an embodiment of the invention, the time delay $t_d$ is chosen to be half of the clock period $T_C$ as n is 1. However, there are still the harmonics of 72 MHz, 84 MHz, 96 MHz, 108 MHz, and 120 MHz in the FM band. The other harmonics can also be cancelled by the following method.

Eq. 5 can be rewritten as shown in Eq. 7. In Eq. 5, the time delay $t_d$ is odd multiples of half of the clock period $T_C$, so that the odd harmonics of the clock frequency $F_C$ are cancelled. Similarly, the m-th harmonic can be cancelled in the same way. The term $F_C$ in Eq. 7 can be replaced by the frequency of the m-th harmonic (m·$F_C$), so that a generic equation is obtained in Eq. 7.

$$2\pi \cdot \frac{t_d}{T_C} = n\pi, n \text{ is odd} \quad \text{(Eq. 7)}$$

$$\Rightarrow 2\pi F_C \cdot t_d = n\pi, n \text{ is odd}$$

$$\Rightarrow 2\pi (m \cdot F_C) \cdot t_d = n\pi, n \text{ is odd}$$

$$\Rightarrow t_d = \frac{n}{m} \cdot \frac{T_C}{2}, n \text{ is odd}$$

According to an embodiment of the invention, the harmonic of 84 MHz is going to be cancelled, and the harmonic of 84 MHz is 14$^{th}$ harmonic of the 6 MHz clock frequency $F_C$. Namely, m is 14. As stated before, the harmonic of 84 MHz can be cancelled when n is an odd integer.

According to the embodiment of the invention, the time delay $t_d$ is chosen to be half of the clock period $T_C$ for cancelling the odd harmonics of the 6 MHz clock frequency $F_C$. According to an embodiment of the invention, the time delay $t_d$ is kept almost constant for reducing the settle time after adjusting the time delay $t_d$. In the condition of keeping the time delay $t_d$ about half of the clock period $T_C$, n should be either 13 or 15 to keep the time delay $t_d$ still around half of the clock period $T_C$, such that the settle time would be minimized after adjusting the time delay $t_d$.

According to another embodiment of the invention, the harmonic of 108 MHz is going to be cancelled, and the harmonic of 108 MHz is 18$^{th}$ harmonic of the 6 MHz clock frequency $F_C$. Namely, m is 18, and n is any odd integer. As stated above, even though n can be any odd integer, the time delay $t_d$ would be kept around half of the clock period $T_C$ to minimize the settle time. That is, n is either 17 or 19 to keep the time delay $t_d$ around half of the clock period $T_C$. According to another embodiment of the invention, n can be any odd number, even though the time delay $t_d$ is far from half of the clock period $T_C$ regardless of the settle time.

As a sum, the control unit 220 in FIG. 2 can choose the proper time delay $t_d$ to make the phase shift φ between the first current $I_{O1}$ and the second current $I_{O2}$ for cancelling the corresponding harmonics of the clock frequency $F_C$ at the output node $N_{OUT}$. Additionally, the phase shift φ can be interpreted as the time delay $t_d$.

Figure 3:
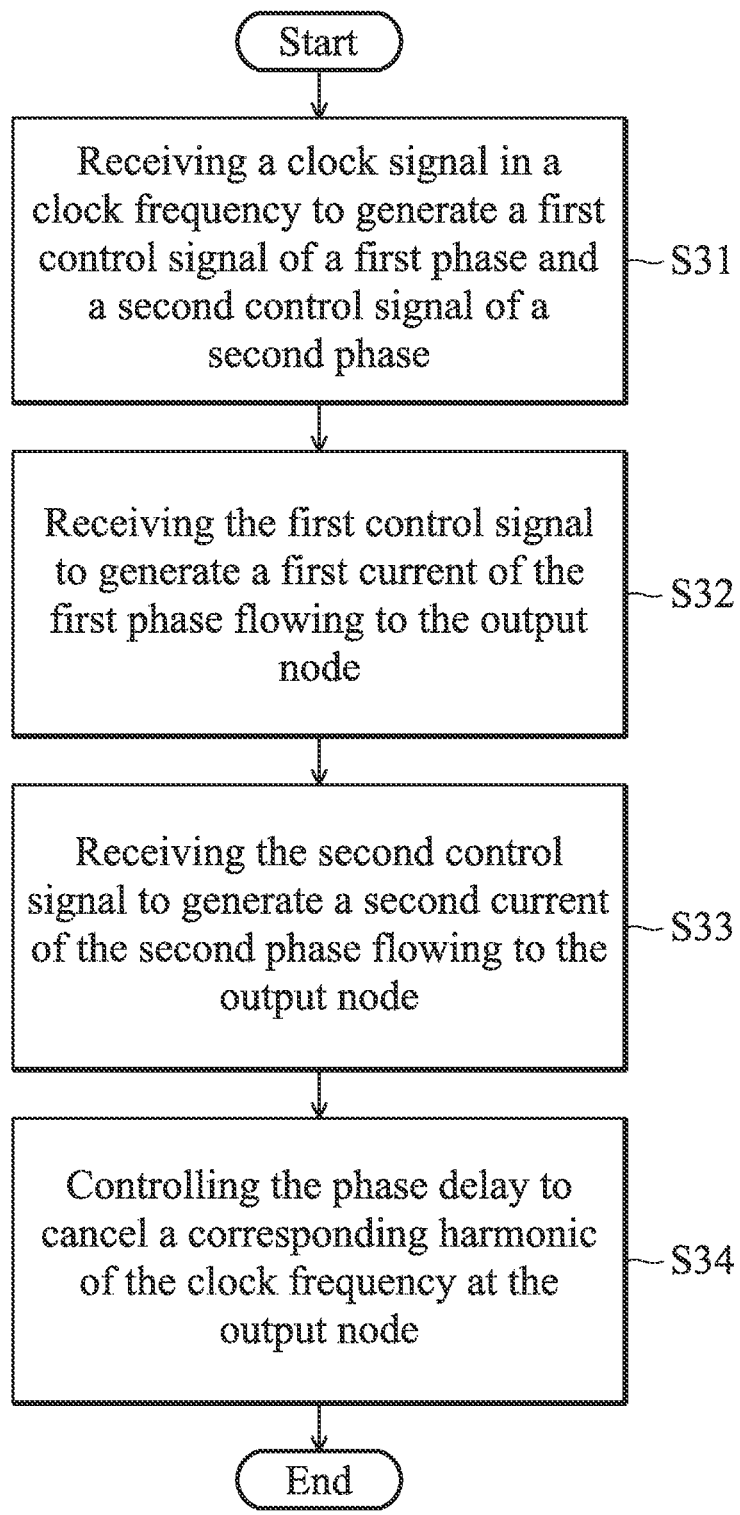
FIG. 3 is a flow chart of the harmonic cancellation method in accordance with an embodiment of the invention.

FIG. 3 is a flow chart of the harmonic cancellation method in accordance with an embodiment of the invention. The flow chart will be described with FIG. 2 in the following description. First, the control unit 220 receives the clock signal $S_{CLK}$ in the clock frequency $F_C$ to generate the first control signal $S_{CTL1}$ and the second control signal $S_{CTL2}$ (Step S31). The first control signal $S_{CTL1}$ is of a first phase, and the second control signal $S_{CTL2}$ is of a second phase. The phase delay φ is the difference between the first phase and the second phase.

The first power unit 201 receives the first control signal $S_{CTL1}$ to generate the first current $I_{O1}$ flowing to the output node $N_{OUT}$ (Step S32), in which the first current $I_{O1}$ is of the first phase. The second power unit 202 receives the second control signal $S_{CTL2}$ to generate the second current $I_{O2}$ flowing to the output node $N_{OUT}$ (Step S33), in which the second current $I_{O2}$ is of the second phase.

The control unit 220 controls the phase delay to cancel a corresponding harmonic of the clock frequency $F_C$ at the output node $N_{OUT}$ (Step S34). According to an embodiment of the invention, the phase delay between the first current $I_{O1}$ and the second current $I_{O2}$ could be considered as the time delay $t_d$, and the time delay $t_d$ could be determined by the equation of $$t_d = \frac{n}{m} \cdot \frac{T_C}{2},$$

where n is odd and m means the m-th harmonic is going to be cancelled.

Figure 4A:
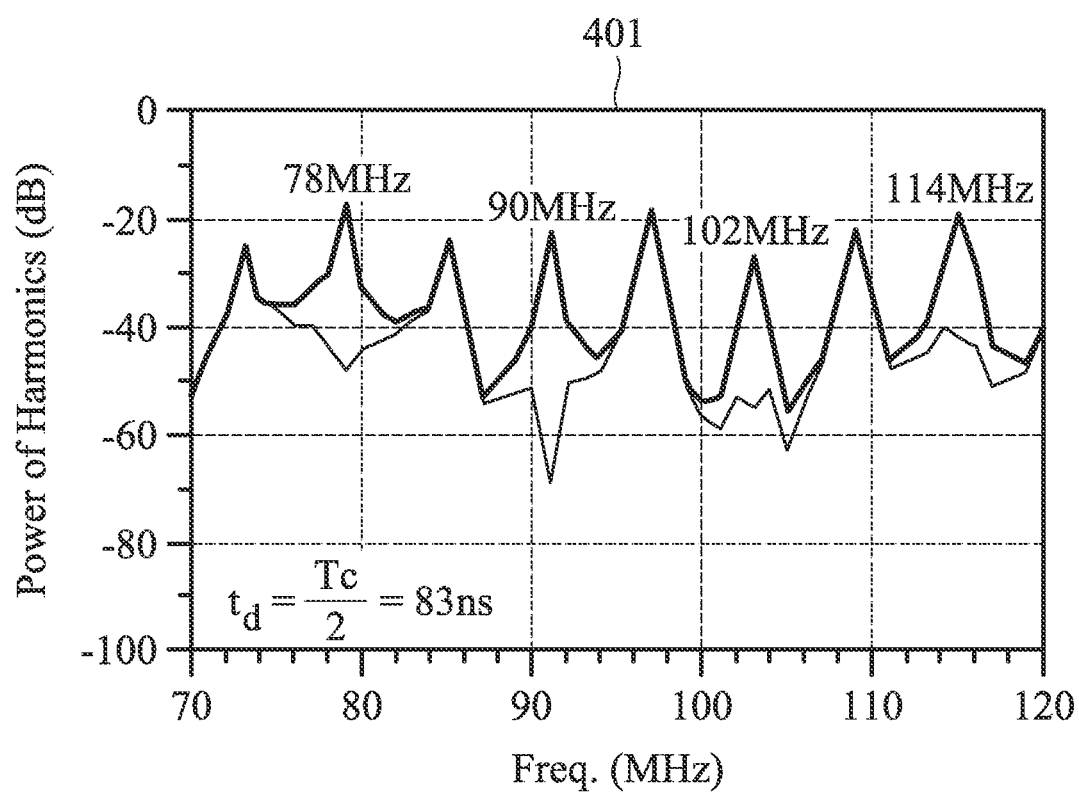
FIGS. 4A and 4B show simulation results of the harmonic cancellation method in accordance with an embodiment of the invention.
Figure 4B:
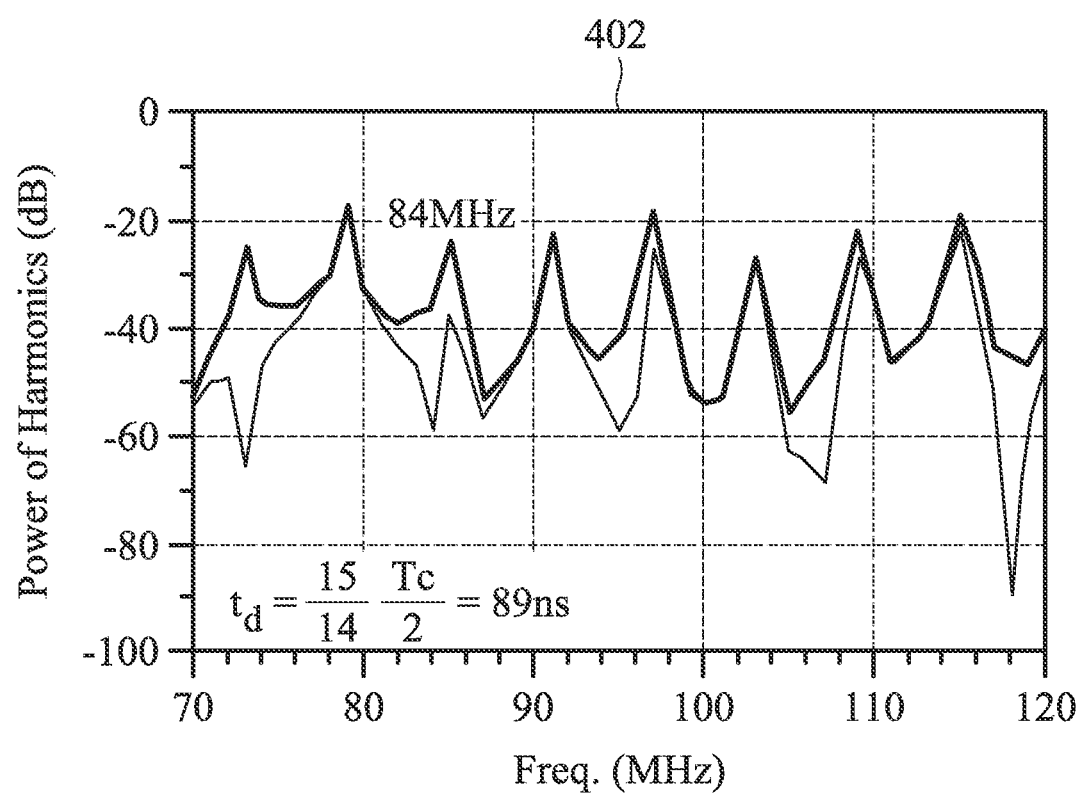

FIGS. 4A and 4B show simulation results of the harmonic cancellation method in accordance with an embodiment of the invention. As shown in FIG. 4A, the plot 401 shows the time delay $t_d$ equal to $$\frac{T_C}{2},$$

such that the time delay $t_d$ is 83 nsec when the clock frequency $F_C$ is 6 MHz.

The thick line in the plot 401 represents the power of the harmonics within the FM band caused by the 6 MHz clock frequency without applying the harmonic cancellation method. The thin line in the plot 401 represents the power of the corresponding harmonics with applying the harmonic cancellation method for cancelling the odd harmonics. It is noticed that the odd harmonics in the FM band (i.e., 78 MHz, 90 MHz, 102 MHz, and 114 MHz) are greatly mitigated more than 20 dB.

As shown in FIG. 4B, the plot 402 shows the time delay $t_d$ equal to $$\frac{15}{14} \cdot \frac{T_C}{2},$$

such that the time delay $t_d$ is 89 nsec when the clock frequency $F_C$ is 6 MHz. The thick line in the plot 402 represents the power of the harmonics within the FM band caused by the 6 MHz clock frequency without applying the harmonic cancellation method. The thin line in the plot 402 represents the power of the corresponding harmonics with applying the harmonic cancellation method for cancelling the harmonic of 84 MHz.

It is noticed that the harmonic of 84 MHz is mitigated about 20 dB. Therefore, FIGS. 4A and 4B provide solid evidences of the harmonic cancellation method provided herein that works well. The specific harmonic can be mitigated even more than 20 dB when the time delay is correctly selected. In addition, one skilled in the art could cancel the switching noise caused by the switched-mode converters at the output node by using of the harmonic cancellation method provided herein.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A power management device, comprising:
 a first power unit, receiving a first control signal of a first phase to generate a first current of the first phase flowing to an output node;
 a second power unit, receiving a second control signal of a second phase to generate a second current of the second phase flowing to the output node, wherein a phase delay is a difference between the first phase and the second phase; and
 a control unit, receiving a clock signal in a clock frequency to generate the first control signal and the second control signal, wherein the control unit controls the phase delay to cancel a corresponding harmonic of the clock frequency at the output node.

2. The power management device of claim 1, wherein the control unit controls a time delay between the first control signal and the second control signal to control the phase delay.

3. The power management device of claim 2, wherein an inverse of the clock frequency is a clock period (TO, wherein the control unit adjusts the time delay to be $$\frac{n}{m} \cdot \frac{T_S}{2},$$

such that the phase delay is n·π and an m-th harmonic is cancelled at the output node, wherein n is an odd integer.

4. The power management device of claim 3, wherein the control unit controls the time delay to be half of the clock period, such that the phase delay is equal to π and odd harmonics are cancelled at the output node.

5. The power management device of claim 1, wherein a first coupling path from the first power unit to the output node and a second coupling path from the second power unit to the output node are symmetric.

6. The power management device of claim 1, wherein each of the first and second power units is a switched-mode DC-DC power converter, and generates DC power at the output node.

7. A power management device, comprising:
 a power-generation module, comprising at least two power units, wherein each of the at least two power units receives a respective control signal of a respective phase to generate a respective current of the respective phase flowing to an output node, wherein at least one phase delay is a difference among the respective phases; and
 a control unit, receiving a clock signal in a clock frequency to generate the control signals wherein the control unit controls the at least one phase delay to cancel a corresponding harmonic of the clock frequency at the output node.

8. The power management device of claim 7, wherein the at least two power units comprise:
 a first power unit, receiving a first control signal of a first phase to generate a first current of the first phase flowing to the output node; and
 a second power unit, receiving a second control signal of a second phase to generate a second current of the second phase flowing to the output node, wherein the phase delay is a difference between the first phase and the second phase.

9. The power management device of claim 8, wherein the control unit controls a time delay between the first control signal and the second control signal to control the phase delay.

10. The power management device of claim 9, wherein an inverse of the clock frequency is a clock period (TO, wherein the control unit adjusts the time delay to be $$\frac{n}{m} \cdot \frac{T_S}{2},$$

such that the phase delay is n·π and an m-th harmonic is cancelled at the output node, wherein n is an odd integer.

11. The power management device of claim 10, wherein the control unit controls the phase delay to be half of the clock period, such that the phase delay is equal to π and odd harmonics are cancelled at the output node.

12. The power management device of claim 8, wherein a first coupling path from the first power unit to the output node and a second coupling path from the second power unit to the output node are symmetric.

13. The power management device of claim 8, wherein each of the first and second power units is a switched-mode DC-DC power converter, and generates DC power at the output node.

14. A harmonic cancellation method for mitigating harmonics of a power management device at an output node, comprising:
 receiving a clock signal in a clock frequency to generate a first control signal of a first phase and a second control signal of a second phase, wherein a phase delay is a difference between the first phase and the second phase;
 receiving, by a first power unit, the first control signal to generate a first current of the first phase flowing to the output node; receiving, by a second power unit, the second control signal to generate a second current of the second phase flowing to the output node; and
 controlling the phase delay to cancel a corresponding harmonic of the clock frequency at the output node.

15. The harmonic cancellation method of claim 14, further comprising: controlling a time delay between the first control signal and the second control signal to control the phase delay.

16. The harmonic cancellation method of claim 15, wherein an inverse of the clock frequency is a clock period ($T_C$), wherein the step of controlling the phase delay to cancel the corresponding harmonic of the clock frequency at the output node further comprises: controlling the time delay to be $$\frac{n}{m} \cdot \frac{T_S}{2},$$

such that the phase delay is n·π and an m-th harmonic is cancelled at the output node, wherein n is an odd integer.

17. The harmonic cancellation method of claim 16, wherein the step of controlling the time delay to be $$\frac{n}{m} \cdot \frac{T_S}{2}$$

further comprises: controlling the time delay to be half of the clock period, such that the phase delay is equal to π and odd harmonics are cancelled at the output node.

18. The harmonic cancellation method of claim 14, wherein a first coupling path from the first power unit to the output node and a second coupling path from the second power unit to the output node are symmetric.

19. The harmonic cancellation method of claim 14, wherein each of the first and second power units is a switched-mode power converter, and generates DC power at the output node.

* * * * *